United States Patent [19]

Graves et al.

[11] Patent Number: 5,284,173
[45] Date of Patent: Feb. 8, 1994

[54] AUTOMATIC CONTINUOUS SELF-DRAINING, SELF-CLEANING AND SELF-REPLENISHING APPARATUS AND SYSTEM FOR WATERING STOCK

[76] Inventors: Thomas W. Graves, 6606 Tam O'Shanter, Houston, Tex. 77036; Robert R. Green, Rte. 4, Box 2B, Granbury, Tex. 76049

[21] Appl. No.: 965,809

[22] Filed: Oct. 23, 1992

[51] Int. Cl.⁵ .................... F04F 10/00; A01K 7/00
[52] U.S. Cl. .......................................... 137/1; 119/74; 119/77; 137/132
[58] Field of Search ..................... 119/69.5, 72.5, 74, 119/77; 137/1, 132, 133, 134, 135, 136, 137, 138, 139

[56] References Cited

U.S. PATENT DOCUMENTS

| | | |
|---|---|---|
| 62,812 | 3/1867 | Boyd . |
| 428,838 | 5/1890 | Friedrick . |
| 444,324 | 6/1891 | Allis . |
| 471,418 | 3/1892 | Clark ............................ 137/132 X |
| 629,277 | 7/1899 | Slack ............................ 137/132 X |
| 983,472 | 2/1911 | Bancroft et al. . |
| 1,092,250 | 4/1914 | Engblom .......................... 119/74 X |
| 1,134,866 | 4/1915 | Kavanagh . |
| 1,496,781 | 6/1924 | Lebr . |
| 1,779,746 | 10/1930 | Murdey ............................... 119/74 |
| 2,250,759 | 7/1941 | Gardner ............................ 119/74 |
| 2,345,284 | 3/1944 | Myers et al. ...................... 137/132 |
| 2,366,766 | 1/1945 | Brodsky ............................. 119/74 |
| 2,452,237 | 10/1948 | Hoburg et al. . |
| 2,585,698 | 2/1952 | Spring . |
| 2,623,500 | 12/1952 | Riley et al. ...................... 119/77 X |
| 3,076,435 | 2/1963 | Seymour ............................ 119/77 |
| 3,216,663 | 11/1965 | Frampton et al. ............. 137/132 X |
| 3,324,834 | 6/1967 | McKinstry . |
| 3,389,712 | 6/1968 | John ............................ 137/132 X |
| 3,797,513 | 3/1974 | Hazen ............................ 137/132 |
| 4,181,142 | 1/1980 | George ......................... 137/139 X |
| 4,281,625 | 8/1981 | Kasai .............................. 119/77 |
| 4,470,371 | 9/1984 | Strickland ......................... 119/78 |
| 4,625,752 | 12/1986 | George ........................... 137/133 X |
| 4,628,867 | 12/1986 | Brougham et al. . |
| 4,649,946 | 3/1987 | Yano ............................ 137/132 X |

FOREIGN PATENT DOCUMENTS 869718 10/1981 U.S.S.R. ............................. 119/74

Primary Examiner—Gerald A. Michalsky
Attorney, Agent, or Firm—J. M. Gilbreth

[57] ABSTRACT

An automatic, continuous self-draining, self-cleaning and self-replenishing method and apparatus for watering stock including a bowl with siphon and a source of water for continuous drip.

7 Claims, 2 Drawing Sheets

AUTOMATIC CONTINUOUS SELF-DRAINING, SELF-CLEANING AND SELF-REPLENISHING APPARATUS AND SYSTEM FOR WATERING STOCK

FIELD OF THE INVENTION

This invention relates to an automatic, continuous, self-draining, self-cleaning and self-replenishing system and apparatus for watering stock.

BACKGROUND OF THE INVENTION

Watering systems currently in use for the dog, cat, poultry, equine, bovine, and swine markets are not "low maintenance". They do not automatically and continuously provide fresh, clean water for the stock. To the contrary, the provision of fresh, clean water continuously using present systems requires significant man hours. For instance, in a typical dog kennel, during hot months, multi-gallon water buckets will be changed many times a day.

In particular, warm weather watering systems currently used in canine, equine, bovine, swine, poultry and other livestock facilities follow two concepts. The first consists of manually rinsed, cleaned and refilled buckets and troughs. The second is a bowl or trough with a float-type device which keeps the container filled. The use of manually attended buckets or troughs requires an enormous number of manhours in order to maintain cool, fresh water in front of the stock. With the float-type device, the animal is required to drink warm, stale water prior to the float actually adding fresh water to the container. Additionally, these float units must be cleaned regularly to maintain sanitation, and the float has a tendency to stick in an open or closed position.

The object of the present invention is to continuously and automatically provide clean and fresh water for stock.

SUMMARY OF THE INVENTION

The present invention provides an automatic, continuous self draining, self-cleaning and self-replenishing apparatus and system for watering stock. A source of water is connected, in the invention's simplest embodiment, to at least one bowl. The bowl contains a drain in the bottom, or the lowest part of the bowl, communicating with a siphon, preferably a siphon integrated into the bowl construction itself. The siphon communicates with all means for draining the bowl at the bottom in order to effect the purpose of cleaning the bowl and providing fresh water after draining.

The siphon has a height, or siphon height, that corresponds to the level of water in the bowl when substantially filled, and a discharge outlet height that is below the bowl drain height at the bottom of the bowl. Water is controllably dripped from the source into the bowl. When the water reaches the substantially filled bowl height, the siphon takes over and drains the bowl completely through the bottom. By the above procedure dirt and debris in the water will be drained along with the water, periodically and automatically. The bowl's preferable round sloping lower walls help ensure that the debris goes out with the water. The drain hole location in the bottom self-cleans the bowl by swirling debris through the bottom. After the water is completely drained automatically, the drip will fill the bowl until the water level again equals the siphon height, supplying fresh, clean, cool water automatically.

In the preferred embodiment the substantially filled bowl height will be approximately one to ½ inch below the top of the bowl. For preferred applications the bowl and the siphon are formed together into an integrally molded plastic stand.

The user may find it advantageous to further drain the siphon discharge outlet into a discharge drain system.

A valve is preferably utilized to connect the source of the water to the bowl to control the drip rate of the water. The size of the bowl and the drip rate determine how frequently the bowl discharges and self-cleanses. The source of water may, in particular, include a garden hose for single bowl applications. The source of water may also include a piped water delivery system. This has particular application in multi-bowl stock watering situations, such as kennels.

DESCRIPTION OF THE PREFERRED EMBODIMENTS

Figure 1:
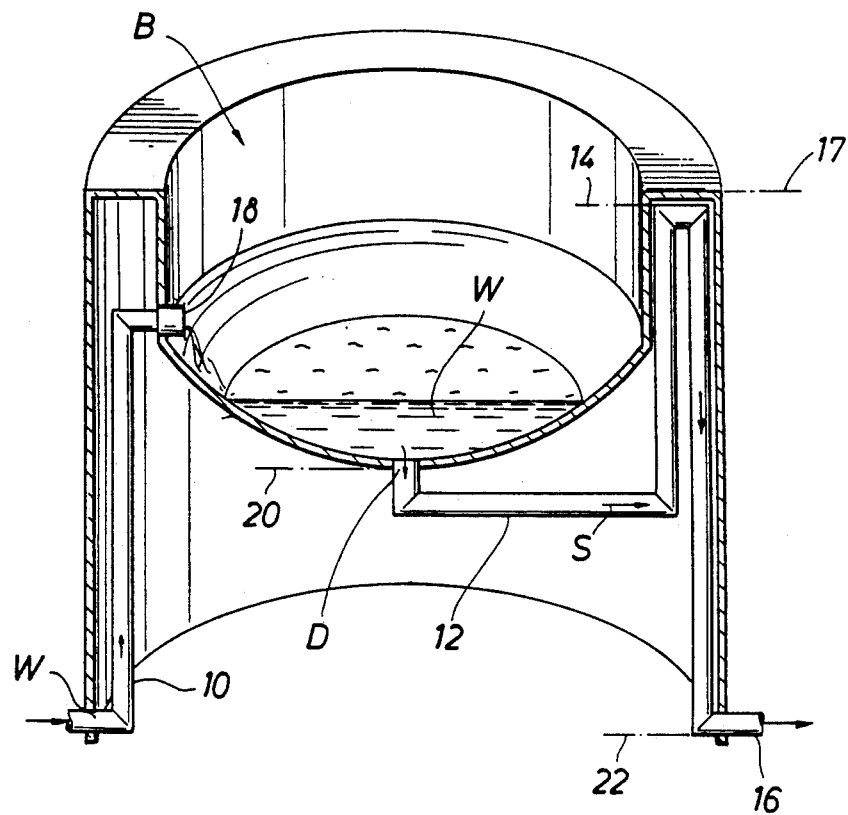
FIG. 1 illustrates in side cutaway fashion the watering system bowl as adapted for a canine model.
Figure 2:
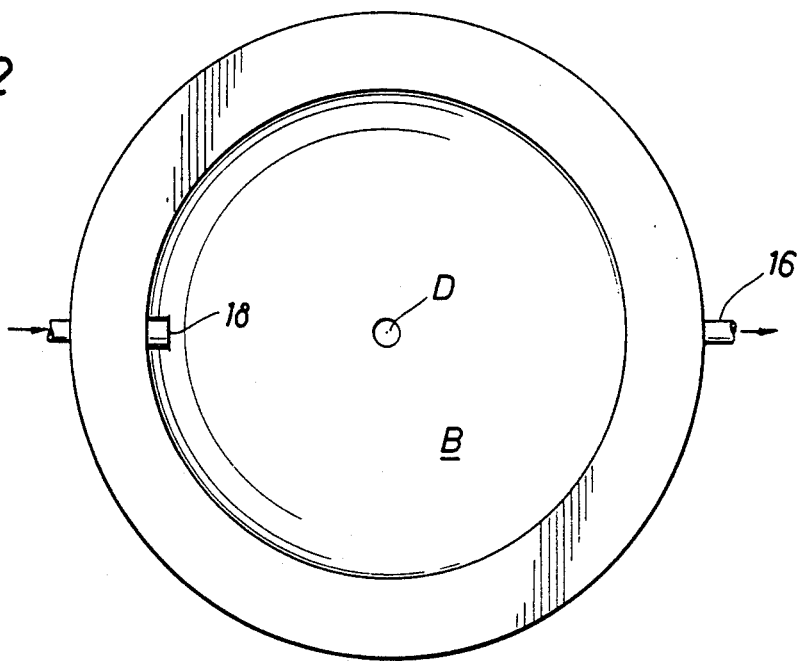
FIG. 2 is a plan-type illustration of the bowl dimensions of the model of FIG. 1.

FIG. 1 is an illustrative cut-away view of a watering bowl B according to one embodiment of the present invention. Drain D in the bottom of the bowl B drains through siphon line 12 and out drainage discharge outlet 16. Siphon line 12 runs up the side of the inside of the bowl structure to height 14, or siphon height 14, which is slightly below the top height 15 of bowl B. Siphon drain line 12 then proceeds down the inside of the structure of bowl B until it discharges at outlet 16 at discharge height 22 near the bottom of the structure for bowl B. It has been found that a distance of ½ inch to 1 inch between siphon height 14 and the top of the bowl height 17 works well. Water W enters bowl B through line 10, also integrated into the inside structure of bowl B. Water W drips out of spigot 18 and the side wall of bowl B.

Figure 3:
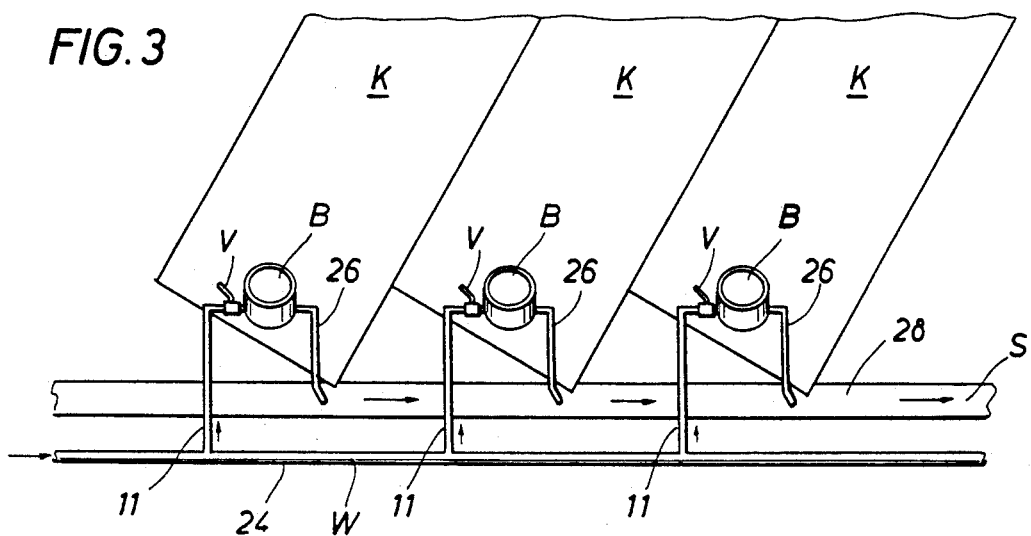
FIG. 3 illustrates a watering system comprised of a piped delivery system with multiple bowls and a discharge drain system.

As illustrated in FIG. 3, water line 10 connects at the outside of bowl B through valve V with further source of water line 11.

In the preferred embodiment the water line is comprised of ¼ inch PVC tubing. The drain or siphon line is comprised of ¼ inch tubing. Drain tubing size may be increased in larger units to speed drain time. Adjustable and controllable valve V permits a drip outlet 18 or shrubbery head outlet 18, to drip water into the bowl at an adjustable flow rate. Fixed flow rate valves, having known flow rates, may be substituted for variable rate valves. In the preferred embodiment the bowl is formed of non-chewable molded high-impact plastic having a nondestructible sturdy casing. Preferably, the bowl has a capacity of approximately 1 to 2 gallons.

In operation, valve V is adjusted to drip water W into bowl B. The rate of drip is a function of the capacity of the bowl and how frequently it is desired for the bowl to drain, cleanse and self-replenish. The hotter the day, the more frequently the bowl may be drained, replenishing the bowl with cool, fresh water. When the water level in the bowl reaches a point just above siphon height 14, siphon forces take effect. The water flows out of the bowl through drain D, carrying with it the old warmed water plus dirt and debris that has accumulated. Preferably the bottom of the bowl is sloped and rounded to enhance the self-cleaning feature of the bowl. Water pipe 10 may be attached to an ordinary garden hose. Alternately, as illustrated in FIG. 3, water line 10 may be attached to a piped water delivery system. Preferably an adjustable shrubbery or drip head mounted just above the slope of the bowl is directed downwards into the bowl for improved cleaning and noise reduction.

As discussed above, the adjustability of flow rate for the fillhead allows the frequency at which the water self dumps and replenishes to be adjusted for varying conditions. During hot weather, a two hour dump/fill cycle may be preferable and as water cools, longer cycles may be appropriate. For example, with a one-gallon bowl and two-hour cycle, approximately 12 gallons will be used. This compares to 16 gallons per day in normal manual kennel usage. Varying the size and output of the fill device, drain line and bowl allows the product to fill a large variety of watering situations.

As illustrated in FIG. 3 discharge outlet 16 may be connected to line 26 which dumps into a drainage system S to carry out the discharged water away. FIG. 3 illustrates a series of three bowls each located in a separate kennel K. The three bowls are connected to a piped water system 24 and a discharge water system 28.

Figure 4:
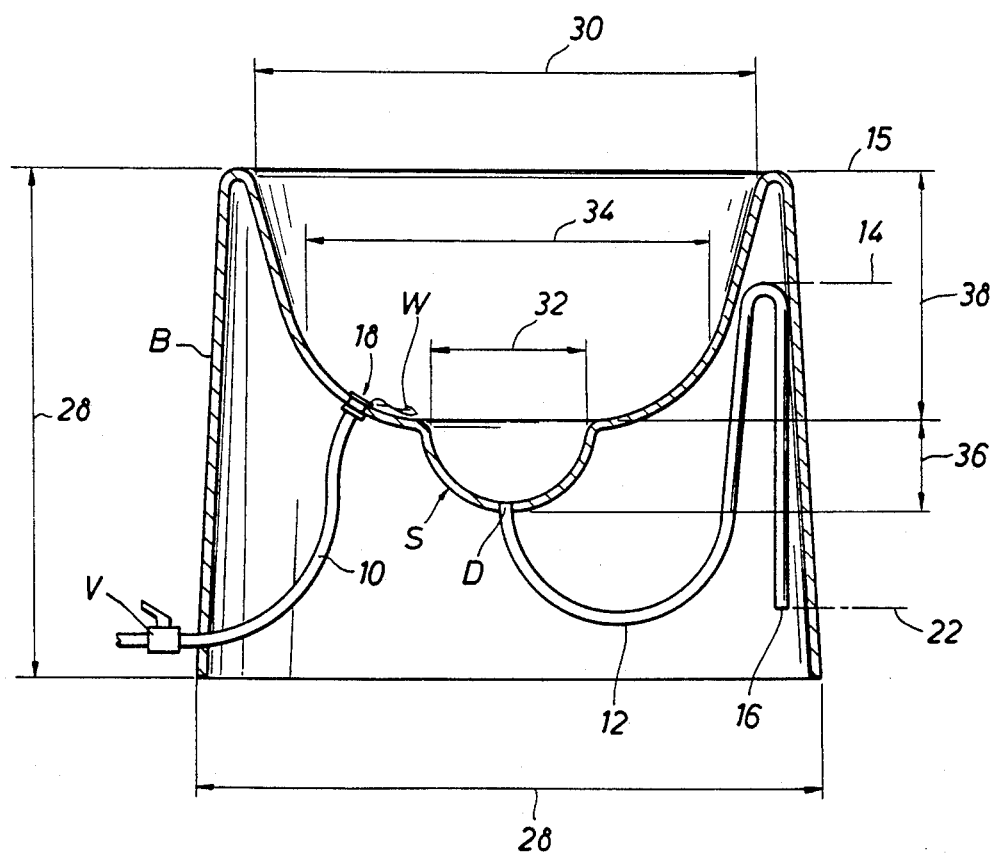
FIG. 4 illustrates in side cutaway fashion a second embodiment of the watering system bowl having a sump.

FIG. 4 illustrates a stock watering bowl B having a sump S in the bottom. The function of sump S is to provide for the quick collection of water for livestock to drink after draining and to assist in the collection and flushing of dirt and debris during draining. Drain D proceeds from the bottom of sump S at the bottom of bowl B. Outlet 18 for the dripping of water W is shown in the side of bowl B. In the embodiment of FIG. 4 water line 10 is affixed to the outside portion of the channel provided for the water into the bowl. Water line 10 extends to an outside valve V that controls the drip rate of the water into the bowl. Water line 10, for instance, could comprise a garden hose.

FIG. 4 also illustrates dimensions for a preferred embodiment. In the embodiment of FIG. 4, width 26 of bowl B is approximately 13½ inches. Height 28 of bowl B is approximately 14 inches. The inside diameter 30 of bowl B at its top is approximately 9 inches.

In the illustration of FIG. 4, drain tube 12 has a ¼ inch diameter. The inside diameter of sump S at its top is approximately 3 inches. The inside diameter of bowl B at a point where the walls tend to slope more steeply toward its top is approximately 8 inches. The inside height 36 of sump S is approximately 1.5 inches. The thickness of the walls of bowl B of FIG. 4 would be approximately ⅜ inches thick. The outside walls of the bowl structure slopes at approximately 3° with the vertical. The upper inside walls of the bowl slope at an angle of approximately 16° with the vertical. The height 38 of the bowl above the sump is approximately 4.75 inches.

Having described the invention above, various modifications of the techniques, procedures, material and equipment will be apparent to those skilled in the art. It is intended that all such variations within the scope and spirit of the invention be included within the scope of the appended claims.

I claim:

1. An automatic, continuous self-draining, self-cleaning and self-replenishing system for watering stock comprising
    connecting a source of water to at least one bowl shaped and dimensioned to permit a stock animal to drink from the bowl bottom, the bowl having lower walls sloping to a drain in the bottom, the drain communicating with a siphon, the siphon having a siphon height corresponding to a substantially filled bowl and a discharge height below the drain level; and
    controllably dripping water from the source into the bowl such that when the water in the bowl reaches the substantially filled height the siphon drains the bowl.

2. The system of claim 1 wherein the substantially filled bowl height is approximately one inch below the top of the bowl.

3. The system of claim 1 wherein the bowl and the siphon are integrated into an integral stand.

4. The system of claim 1 that further includes discharging the siphon through a discharge drain unit.

5. The system of claim 1 wherein controlling the drip rate of the water includes connecting the source of water to the bowl through a valve.

6. The system of claim 1 wherein the source of water includes a garden hose.

7. The system of claim 1 wherein the source of water includes a piped water delivery system.

* * * * *